United States Patent Office 3,506,598
Patented Apr. 14, 1970

3,506,598
THERMO-CURING COATING POWDER
COMPOSITION
Gaylord L. Groff, North St. Paul, Minn., and John L. Ridihalgh, Ames, Iowa, assignors to Minnesota Mining and Manufacturing Company, St. Paul, Minn., a corporation of Delaware
No Drawing. Continuation-in-part of abandoned application Ser. No. 478,427, Aug. 9, 1965. This application Jan. 22, 1968, Ser. No. 699,364
Int. Cl. C08g 30/14
U.S. Cl. 260—2                                         6 Claims

ABSTRACT OF THE DISCLOSURE

Solid, powdered, fusible, thermosetting compositions used to form tough, well-bonded, flexible, impact-resistant, protective coatings by suspension or spray coating procedures. These coating compositions include an epoxy resin, aromatic polyamine-hardener and a co-catalyst combination of a metal salt and carboxylic compound. The metal salt can be tin, zinc or lead carboxylates. The co-catalyst can be aliphatic or aromatic carboxylic acids and anhydrides.

---

This application is a continuation-in-part of an earlier application, Ser. No. 478,427, filed Aug. 9, 1965, now abandoned.

BACKGROUND OF THE INVENTION

Thermosetting powdered resins used in suspension coating procedures, in which a heated workpiece is immersed in a suspension of the particles, must be initially and temporarily thermosoftening and subsequently thermosetting. They must be shelf-stable, that is, not be susceptible to premature gelling and curing when stored for relatively long periods of time or at slightly elevated temperatures up to possibly 50 or 60° C. Upon fusing, the powders should form a relatively smooth, well-bonded, relatively uniform, and continuous coating over the surfaces of the workpiece including coated high spots and sharp edges; and for articles exposed to outdoor or ground environmental conditions, the powders must form a coating that is strong, tough, infusible, and heat- and chemical - resistant. Continuous high-speed coating is highly desirable in the commercial practice of suspension coating of articles (e.g. fluidized bed coating, and spray coating including electrostatic coating), and, as a result, resins that provide coatings of the above characteristics and that also gel and then thermoset to an infusible, tough state rapidly after fusing on a heated workpiece are sought. Resins having gelling and post curing times that aggregate a few minutes or less are much preferred for the commercial practice of suspension coating.

In addition, coatings that are pliant and flexible are desired. Protective coatings may thus be applied by suspension coating procedures to articles that are flexed or given a permanent distortion in use. For example, underground pipe, which is a principal subject for suspension coating, often has applications requiring it to be bent just prior to installation.

SUMMARY OF THE INVENTION

The coating compositions of the present invention, as far as we are aware, are the first rapid-curing, satisfactorily protective coating compositions based on common commercial varieties of diglycidyl ethers of polyhydric phenols that form coatings having sufficient pliancy as to permit permanently distorting the shape of the article coated without forming faults in the coating. In preferred embodiments the new compositions cure within 60 or 90 seconds or even less. As an illustration of their flexible properties, unsupported films of the new coating materials are in preferred embodiments elongatable about 8 or 10 percent and in some preferred embodiments are elongatable even more before they rupture. These new coating materials also provide coatings of increased impact resistance, and otherwise exhibit excellent mechanical properties, as well as good electrical properties.

The resin-based, powdered coating compositions of the present invention comprise in general a room-temperature-solid epoxy resin that averages more than one 1,2 epoxy group per molecule; a room-temperature-solid, heat-activatable, epoxy-reactive hardener in an amount sufficient to form a crosslinked product with the epoxy resin, said hardener comprising an aromatic polyamine that includes at least two primary or secondary nitrogen atoms directly attached to an aromatic ring and carrying a combined total of at least three active hydrogen atoms; and a catalytic amount of a heat-activatable catalytic accelerator for increasing the rate of the curing reaction comprising a co-catalyst combination of a metal salt of a carboxylic acid and a carboxylic compound. This co-catalyst combination can be selected from three groups:

(1) Co-catalyst combinations of (a) tin salts of carboxylic acid and (b) carboxylic compounds selected from carboxylic acids and carboxylic acid anhydrides;

(2) Co-catalyst combinations of (a) zinc or lead salts of carboxylic acid and (b) carboxylic acid anhydrides; and (3) Co-catalyst combinations of (a) zinc or lead salts of carboxylic acid and (b) aromatic carboxylic acids.

A broad range of compounds containing 1,2 epoxy groups have use in the coating compositions of the present invention. These epoxy compounds should be solids at room-temperature, melting at temperatures above about 60° C. or even 75° C.; and in the uncured state, even without other components present, they preferably are sufficiently brittle as to be pulverizable. They must average more than one, and preferably close to two or more 1,2 epoxy groups per molecule for crosslinking. The room-temperature-solid commercial varieties of diglycidyl ethers of polyhydric phenols, particularly the diglycidyl ether of bisphenol A are preferably and commonly used. However, synthesized, internally-complex, 1,2 epoxy-containing compounds are also used and their use achieves variation in the properties of cured products. For example, powdered resin coating compositions that produce coatings of even increased flexibility over that obtainable with compositions containing common epoxy resins may be based on epoxy-terminated polyesters and polyamides, these epoxy-terminated polymers being disclosed in the copending application of Kurka and Groff, Ser. No. 478,-483, filed Aug. 9, 1965, now abandoned.

As hardeners in the fast-curing, flexible coating compositions of this invention we use room-temperature-solid, heat-activatable aromatic polyamines. These polyamine compounds have at least two primary or secondary nitrogen atoms that are attached directly to an aromatic ring and a combined total of at least three active hydrogen atoms. Examples of these compounds are meta-, ortho-, and paraphenylene diamines, 4,4'-methylene dianiline, diamino-diphenyl sulfone, 1,4 - napthalenediamine, 3,4-toluene diamine, and oxydianiline. To insure fast gelling and hardening of the coating composition, at least about 0.85 active hydrogen equivalent weights of aromatic amine should be included in the composition for each epoxide equivalent weight of epoxy compound. On the the other hand, to achieve compositions giving coatings of the desired flexibility, the aromatic amine component should not exceed about 1.5 active hydrogen equivalent weights per epoxide equivalent weight of epoxy compound. Even better results are achieved when the ratio of aromatic amine to epoxy compound expressed as a ratio of active hydrogen equivalent weights to epxide equivalent weights is between 0.95 and 1.3, with the most ideal ratio being about 1.2.

The third essential ingredient of the coating composition of this invention is a catalytic amount of co-catalysts selected from certain classes of heat-activatable co-catalyst combinations of a metal salt of an inorganic carboxylic acid, including tin, zinc, and lead salts, with either a carboxylic acid or a carboxylic acid anhydride. The catalysts in the combinations of these classes have been found to cooperate to produce much faster curing of the compositions of the invention than either catalyst would produce by itself; also, the compositions including these catalysts produce high-quality coatings having good durability, flexibility, and impact-resistance. Representative examples of the carboxylic acids include acetic, adipic, succinic, benzoic and phthalic acids, while representative examples of the acid anhydrides include phthalic, tetrahydrophthalic, succinic, chlorendic and polyazelaic anhydrides. It is theorized that the catalysts in these combinations accelerate curing without inhibiting flexibility because they do not catalyze homopolymerization of the epoxy resin. Though acids and anhydrides are normally used as crosslinkers for epoxy resins, we believe their function in compositions of the invention is catalytic only.

As previously described, three useful classes of co-catalyst combinations have been found. The class formed by the co-catalyst combinations of tin salts of carboxylic acids and either carboxylic acids or carboxylic acid anhydrides is the most preferred, since the particulate coating materials cure fastest with those catalysts and form coatings that exhibit the most desired properties; within this class, the combinations that include anhydrides are further preferred. Representative examples of the carboxylic acids of these combinations include acetic, adipic, succinic, benzoic, and phthalic acids, while representative examples of the acid anhydrides include phthalic, tetrahydrophthalic, succinic, chlorendic, and polyazelaic anhydrides. Normally the combinations include one salt and either one acid or anhydride, but mixtures of the useful catalysts can also be used. The co-catalysts of the second class, zinc and lead salts of carboxylic acids in combination with carboxylic acid anhydrides, also produce curing that is quite fast, but somewhat less fast than that of the catalysts of the preferred class. As a third class, zinc and lead salts have also been found to produce fast curing when combined with aromatic carboxylic acids, which have a carboxyl group directly attached to an aromatic ring and which are exemplified by phthalic, tetrahydrophthalic, and benzoic acid; but to obtain fast curing with aromatic carboxylic acids, these salts should be used in somewhat larger concentrations than would otherwise be necessary.

The concentration of the metal salt in the coating compositions of the invention normally ranges from 0.2 to 5 weight percent of the epoxy resin, and that of the acid or anhydride from 0.1 to 3 weight percent of the epoxy resin, so long as the number of acid or anhydride equivalent weights is not greater than 0.2 of the number of epoxide equivalent weights of epoxy compound. Liquid compounds that have a low boiling point are less preferred because some vaporization may occur when the particles fuse on a heated workpiece; however, a small amount of liquid material may be present without upsetting the required characteristics for a particulate mass of the modified resin material.

Beside epoxy resin, aromatic amine, and the co-catalyst combination, coating compositions of the invention desirably include a flow control agent and may also include pigments and fillers. Where highest flexibility is essential the use of fillers is not preferred, though fillers do improve mechanical properties such as impact-resistance.

The components of compositions of the invention are preferably mixed, as on rubber mills or internal mixers, while subjected to elevated temperatures of about 70° C. for just sufficient time to form them into a thoroughly homogeneous, fused blend. During the mixing, a minor amount of reaction between the epoxy resin and aromatic amine may occur, but the two remain substantially unreacted and capable of subsequently fusing and curing on a heated workpiece. After mixing, the composition is cooled rapidly until solid and then pulverized until a particulate mass is formed that should have a particle size less than about 40 mesh. Dry blends of the pulverized components formed without fusing the components may be used, but are not preferred.

In the following axamples the unique properties possessed by combinations of the invention are illustrated. In Examples 1–8, Araldite 7072, a diglycidyl ether of bisphenol A having an average epoxide equivalent weight of 625 and a melting point of 85–90° C. was used as the base epoxy resin. In Example 9 an epoxy-terminated polyester having an acid number of 0.3 and an epoxide equivalent weight of 1600 (comprising the reaction product of one carboxyl equivalent of acid-terminated 1,4-butanediol-adipate having an acid number of 53.6 and hydroxyl number of 2 with four epoxide equivalent weights of diglycidyl ether of bisphenol A having an average epoxide equivalent weight of 950 and a melting point of 95–105° C. (Epon 1004) was used. The wetting agent in the examples was Modaflow, a polymerized ethyl acrylate-long chain hydrocarbon.

The components of the various examples were homogeneously mixed for about ten to twenty minutes on a two-roll rubber mill in which one roll was heated by steam to about 45° C. and the mixture then sheeted off in thicknesses of less than one centimeter. After being cooled by circulating air, the sheets were ground to a particle size of 100 mesh or lower. The ground particles were sprayed on clean one-inch pipe preheated to about 250° C. in an 8 mil thickness unless otherwise indicated. After the times listed in the examples, the pipes were quenched by cold water to room temperature.

In testing the compositions of the examples for impact-resistance, an 8 to 10 mil (0.02 to 0.025 centimeter) layer of the compositions was first fusion coated on a ⅛-inch (0.318 centimeter) steel plate. The samples were then placed in a Gardner Impact Tester where a 2-pound (9-kilogram) weight having a curved end striker with a ⅝-inch (1.59-centimeter) diameter was allowed to fall from various heights on the coated surface. In all of the examples the coatings showed no rupture or cracking or any visible fault when subjected to an impact of more than 160 inch-pounds. The flexibility of the coatings in the various examples was further demonstrated by bending the coated one-inch pipe 90° with a conduit bender. In all of the examples the coating showed no visible separation from the pipe nor any cracks or pinholes either before or after the pipe was bent.

EXAMPLE I

|  | Wt. parts |
|---|---|
| Araldite 7072 | 625 |
| 4,4'-methylene dianiline | 60 |
| Tetrahydrophthalic anhydride | 7 |
| Stannous octoate (T–9) | 7 |
| Wetting agent | 3 |

The coating gelled on the pipe after 10 seconds and was quenched after a total time on the pipe of 60 seconds. A thin film (5 mils (0.127 millimeter) in thickness) of the above product was also prepared by fusion coating on a release surface. The film exhibited a tensile strength of 8700 pounds/square inch (612.5 kilograms/square centimeter) and an elongation at break of 8.5 percent. Dielectric properties, specifically the dissipation factor and dielectric constant, were measured for this film at a frequency of 100 cycles/second at the following temperatures:

|  | 23° C. | 60° C. | 90° C. | 120° C. | 150° C. | 180° C. |
|---|---|---|---|---|---|---|
| Dielectric constant | 3.14 | 3.11 | 3.09 | 3.18 | 3.48 | 4.07 |
| Dissipation factor | 0.002 | 0.002 | 0.003 | 0.019 | 0.061 | 0.565 |

EXAMPLE II

|  | Wt. parts |
|---|---|
| Araldite 7072 | 625 |
| 4,4'-methylene dianiline | 60 |
| Stannous octoate (T-9) | 7 |
| Phthalic anhydride | 7 |
| Wetting agent | 4 |

The coating gelled on the pipe in 3 seconds and was quenched after 30 seconds.

EXAMPLE III

|  | Wt. parts |
|---|---|
| Araldite 7072 | 625 |
| 4,4'-methylene dianiline | 60 |
| Zinc stearate | 14 |
| Tetrahydrophthalic anhydride | 7 |
| Wetting agent | 3 |

The coating gelled after 10 seconds and was quenched after 40 seconds.

EXAMPLE IV

|  | Wt. parts |
|---|---|
| Araldite 7072 | 625 |
| 4,4'-methylene dianiline | 60 |
| Stannous stearate | 14 |
| Tetrahydrophthalic anhydride | 7 |
| Wetting agent | 3 |

The coating gelled after 7 seconds and was quenched after 40 seconds.

EXAMPLE V

|  | Wt. parts |
|---|---|
| Araldite 7072 | 625 |
| 4,4'-methylene dianiline | 60 |
| Stannous octoate (T-9) | 6 |
| Succinic anhydride | 6 |
| Wetting agent | 4 |

The coating gelled after 7 seconds and was quenched after 60 seconds.

EXAMPLE VI

|  | Wt. parts |
|---|---|
| Araldite 7072 | 625 |
| m-Phenylene diamine | 48 |
| Stannous octoate (T-9) | 6 |
| Tetrahydrophthalic anhydride | 6 |
| Wetting agent | 3 |

The coating gelled in 4 seconds and was quenched after 90 seconds.

EXAMPLE VII

|  | Wt. parts |
|---|---|
| Araldite 7072 | 625 |
| 4,4'-methylene dianiline | 60 |
| Stannous octoate (T-9) | 7 |
| Adipic acid | 7 |
| Wetting agent | 4 |

The coating gelled after 7 seconds and was quenched after 90 seconds.

EXAMPLE VIII

|  | Wt. parts |
|---|---|
| Araldite 7072 | 625 |
| 4,4'-methylene dianiline | 60 |
| Benzoic acid | 14 |
| Stannous octoate (T-9) | 7 |
| Wetting agent | 4 |

The coating gelled after 3 seconds and was quenched after 40 seconds.

EXAMPLE IX

|  | Wt. parts |
|---|---|
| Epoxy-terminated polyester | 800 |
| 4,4'-methylene dianiline | 37.5 |
| Stannous octoate (T-9) | 7 |
| Tetrahydrophthalic anhydride | 7 |
| Wetting agent | 1.5 |

The pipe was preheated to about 260° C. and the time for gelation was 11 seconds and until quenching was 40 seconds. Unsupported 5 mil (0.127 millimeter) films of the product of this example were also prepared by fusion coating on a release surface and found to have a tensile strength of 6100 pounds/square inch (430 kilograms/square centimeter) and were elongated 42 percent at break. The dissipation factor and dielectric constant for the sample were measured at 100 cycles/second at various temperatures with the following results:

|  | 23° C. | 60° C. | 90° C. | 150° C. | 120° C. | 135° C. |
|---|---|---|---|---|---|---|
| Dissipation factor | 0.002 | 0.013 | 0.015 | 0.026 | 0.134 | 0.477 |
| Dielectric constant | 3.96 | 4.26 | 5.10 | 5.08 | 5.00 | 5.92 |

The invention is further illustrated in the following tables, which show the cooperative effect of two catalyst in co-catalyst combinations of the invention. The results in these tables were obtained from samples prepared by mixing the components homogeneously on a two-roll, steam-heated rubber mill. A chip from the cooled, one-centimeter-thick sheet of the resulting fused blend was then placed on a hot plate heated to 400° F., and the time to gel measured. The components in each of the samples included 625 grams of diglycidyl ether of bisphenol A having an epoxide equivalent weight range of 550–700 and a melting point of 75–85° C. (Epon 1002) and 60 grams of 4,4'-methylene dianiline. For purposes of comparison, some samples included just these ingredients without any catalysts, or just an acid or anhydride in addition to these two ingredients, or just a salt in addition. Samples of the compositions of this invention, of course, included both a salt and either an acid or anhydride. In the first two tables, the proportion of both the salt and the acid or anhydride, when included, was 7 grams. In the third table, the compositions included 7 grams of the acid and 31 grams of the metal salt.

TABLE I

|  | Gel time at 400° F. (seconds) | |
|---|---|---|
|  | Without metal salt | Stannous octoate |
| Adipic acid | 54 | 6 |
| Tetrahydrophthalic acid | 45 | 8 |
| Succinic acid | 45 | 8 |
| Azelaic acid | 45 | 10 |
| Tetrahydrophthalic anhydride | 46 | 5 |
| Succinic anhydride | 42 | 4 |
| Neither acid not anhydride | 73 | 24 |

TABLE II

|  | Gel time at 400° F. (seconds) | |
|---|---|---|
|  | Zinc stearate | Lead acetate |
| Tetrahydrophthalic anhydride | 8 | 20 |
| Succinic anhydride | 13 | 20 |
| No anhydride | 42 | 45 |

TABLE III

|  | Gel time at 400° F. (seconds) | |
|---|---|---|
|  | Zinc stearate | Lead acetate |
| Tetrahydrophthalic acid | 12 | 16 |

In typical applications of the particulate compositions of this invention, a metal workpiece is preheated and then placed in a fluidized bed of the particles, or subjected to a spray of the particles, etc. Another procedure is to adhere a layer of the particles to the workpiece by electrostatics and then heat the workpiece. Preferably the workpiece is heated to 150° C. or higher to achieve rapid-curing.

Compositions of this invention are useful in molding compositions particularly in the encapsulation of electrical components; for such uses it is sometimes desirable to add surface-acting release agents, pigments, fillers and the like.

What is claimed is as follows:

1. A particulate, normally solid and brittle, shelf-stable coating composition that initially and temporarily thermo-softens and subsequently gels and thermosets in seconds to provide on a heated workpiece coated with said particles a well-bonded, strong, tough, heat- and chemical-resistant and flexible coating, comprising a blend of a room-temperature-solid 1,2-epoxy resin averaging more than one 1,2-epoxy group per molecule, a room-temperature-solid heat-activatable epoxy-reactive hardener in an amount sufficient to crosslink the epoxy resin, said hardener comprising an aromatic polyamine that includes at least two groups selected from primary and secondary nitrogen atoms that are directly attached to an aromatic ring and that carry a combined total of at least three active hydrogen atoms, and a catalytic amount of a heat-activatable catalytic accelerator selected from the group consisting of
   (1) co-catalyst combinations of (a) tin salts of carboxylic acids and (b) carboxylic compounds selected from carboxylic acids and carboxylic acid anhydrides;
   (2) co-catalyst combinations of (a) metal salts selected from zinc and lead salts of carboxylic acids and (b) carboxylic acid anhydrides; and
   (3) co-catalyst combinations of (a) metal salts selected from zinc and lead salts of carboxylic acids and (b) aromatic carboxylic acids.

2. The coating composition of claim 1 in which substantially all of the particles includ epoxy resin, hardener and catalytic accelerator.

3. The coating composition of claim 1 in which the hardener is included in an amount between about 0.85 and 1.5 active hydrogen equivalent weights for each epoxide equivalent weight of epoxy compound, the metal salt is included in an amount between about 0.2 and 5 weight percent of the epoxy resin, the carboxylic acid or acid anhydride is included in an amount between about 0.1 and 3 weight percent of the epoxy resin, and the number of acid and anhydride equivalent weights of acid and anhydride is not greater than 0.2 of the number of epoxide equivalent weights of epoxy compound.

4. The coating composition of claim 3 in which the hardener is included in an amount between about 0.95 and 1.3 active hydrogen equivalent weights for each epoxide equivalent weight of epoxy compound.

5. The coating composition of claim 1 in which the carboxylic compound is selected from carboxylic acid anhydrides.

6. The coating composition of claim 1 in which the metal salt is selected from tin salts of carboxylic acids.

References Cited

UNITED STATES PATENTS

| | | | |
|---|---|---|---|
| 3,316,191 | 4/1967 | Montesano | 260—47 X |
| 3,201,360 | 8/1965 | Proops et al. | 260—18 |
| 3,039,987 | 6/1962 | Elbling | 117—21 X |
| 2,989,498 | 6/1961 | Mackenzie et al. | 260—47 |
| 2,801,229 | 7/1957 | De Hoff et al. | 260—47 |
| 3,094,498 | 6/1963 | Landolt | 260—28 |
| 3,450,654 | 6/1969 | Ramos | 260—18 |

FOREIGN PATENTS

| | | |
|---|---|---|
| 903,933 | 8/1962 | Great Britain. |
| 822,928 | 11/1959 | Great Britain. |

DONALD E. CZAJA, Primary Examiner

C. W. IVY, Assistant Examiner

U.S. Cl. X.R.

117—21, 132; 252—426; 260—18, 47